UNITED STATES PATENT OFFICE.

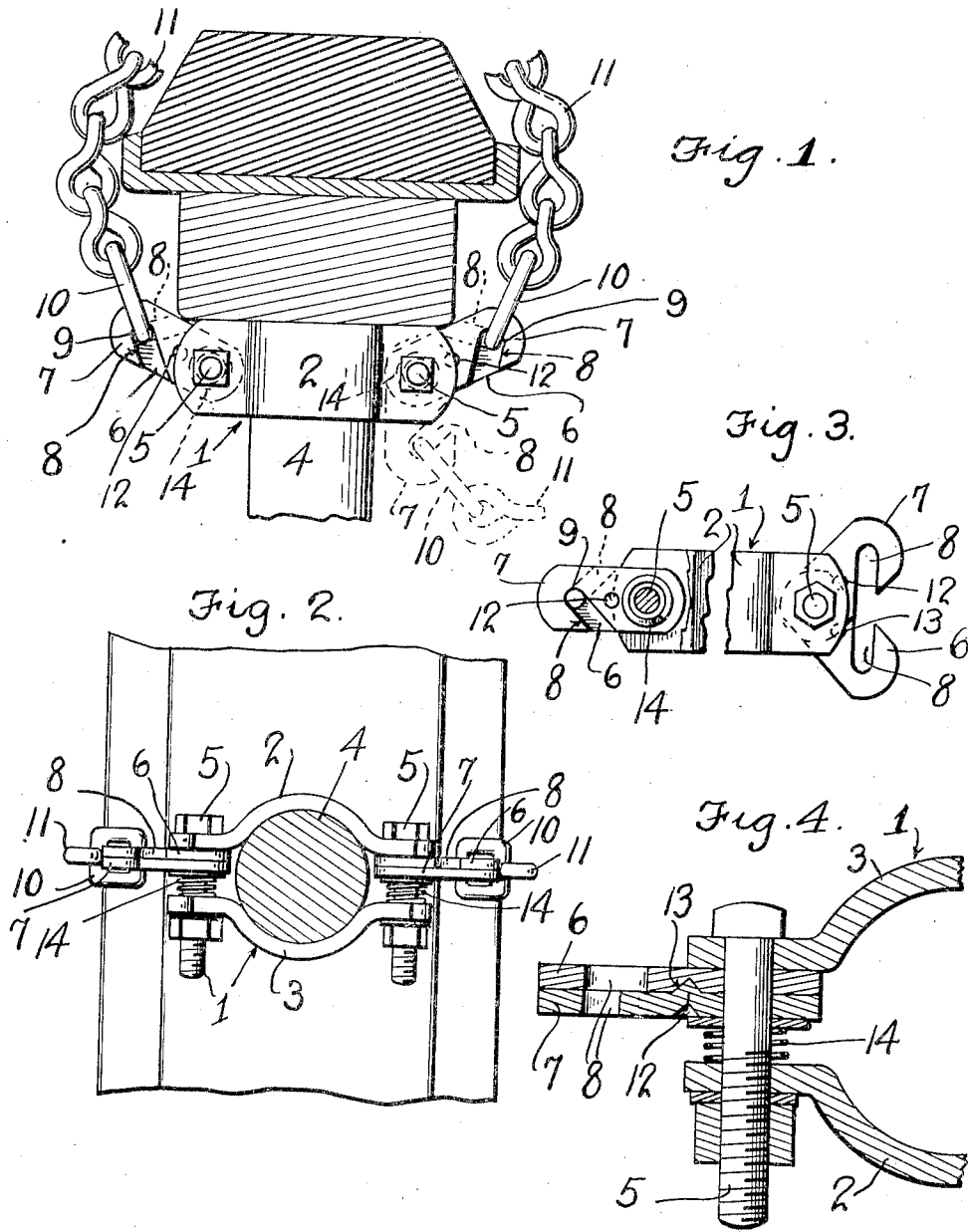

ISADORE SIEGAL, OF PITTSBURGH, PENNSYLVANIA.

FASTENING DEVICE.

1,359,440. Specification of Letters Patent. Patented Nov. 16, 1920.

Application filed October 15, 1918. Serial No. 258,148.

*To all whom it may concern:*

Be it known that I, ISADORE SIEGAL, a citizen of the United States, residing at Pittsburgh, in the county of Allegheny and State of Pennsylvania, have invented new and useful Improvements in Fastening Devices, of which the following is a specification.

This invention relates to an anti-skid device for tires and has for its primary object to simplify a device of this character without sacrificing the efficiency or durability thereof.

An object of the invention is to provide a device the main portion of which may be permanently associated with the wheel so that by quickly adding a chain section, the device may be rendered operative.

A further object is to provide a device composed of but few parts in which the hooks for attaching the chain may be readily replaced.

With these and other objects in view the invention will be better understood from the following detailed description taken in connection with the accompanying drawing wherein:—

Figure 1 is a sectional view of one form of tire showing my invention applied thereto, the chain being partly broken away.

Fig. 2 is an underneath view thereof.

Fig. 3 is a detailed side view of the clamp with portions broken away.

Fig. 4 is a detail section through one of the hooks and associated parts.

Again referring to the drawing illustrating one form of my invention, the numeral 1 designates a clamp shown in this particular instance as consisting of two members 2 and 3 secured to a spoke 4 by means of bolts 5. Pivotally mounted upon each bolt 5 is a pair of hook members 6 and 7, each provided with a slot 8, these slots being so related that when the members are in parallel relation to each other they will provide an inclosed opening 9 for a link 10 of a chain section 11.

This chain section 11 passes directly around the tire so as to engage the traction surface and prevent skidding or slipping of the tire in the known manner. From this arrangement it will be seen that the chain section 11 may be quickly arranged in place and should the same become mutilated or broken it may be quickly replaced by a new chain section. A very important feature of my invention is the manner in which the link 10 engages the hook elements so that the pulling action of the chain 11 will positively prevent disengagement between the hook elements and the link 10.

One of the members, as member 7, is provided with a tapering lug 12 adapted to be seated in a correspondingly shaped recess 13 in the member 6 when the members are arranged in operative relation. To prevent accidental displacement between the lug 12 and recess 13, I mount upon bolt 5 a coil spring 14 acting in a direction to press the members into engagement with each other and yieldably hold the lug 12 in recess 13.

From the foregoing description taken in connection with the accompanying drawing it should be apparent that I provide a device of simple and substantial construction in which stresses generated in use will not disengage the parts and in which new elements may be quickly and easily substituted in case of breakage or wear. It is of course to be understood that the invention may be constructed in various other manners than illustrated and therefore I do not desire to be limited in any manner except as set forth in the claims hereunto appended.

Having described my invention, what I claim is:

1. In a device of the character described, a clamp including opposed plates, securing bolts inserted through said plates, hooks mounted on said bolts, and guard members for the hooks also mounted on the bolts and separate from said hooks.

2. In a device of the character described, a clamp including opposed plates, securing bolts inserted through said plates, hooks, guard members for the hooks, and means for forcing said guard members toward the hooks, said means and the hooks and the guard members being mounted upon the bolts, and the hooks and guard members being provided with coöperating means for normally holding the guard members in operative relation to the bolts.

3. In a device of the character described, a clamp including opposed plates, securing bolts inserted through said plates, hooks positioned between the plates and mounted on the bolts, guard members positioned adjacent the hooks and mounted on the bolts, and expansion springs mounted about the bolts and confined between one of the plates and the guard members for forcing said members toward the hooks, the hooks and the guard members being provided with coöperating means for locking the guard members in operative relation to the hooks.

In testimony whereof I affix my signature.

ISADORE SIEGAL.